April 7, 1936.                H. R. TEAR                2,036,509
                          LUBRICATING DEVICE
                          Filed April 1, 1932          2 Sheets-Sheet 2
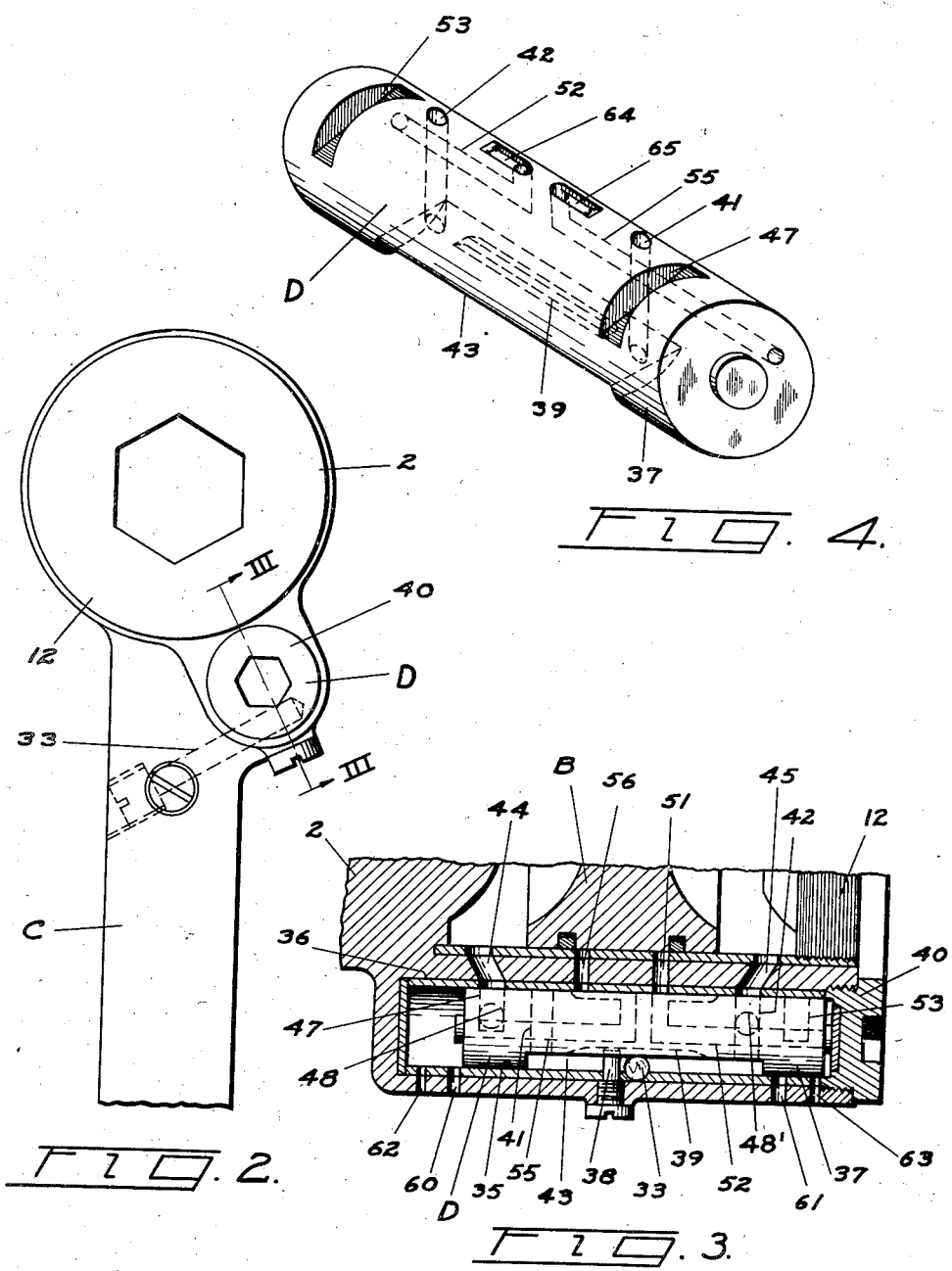
INVENTOR.
Harry R. Tear
BY
John A. Watson
ATTORNEY.

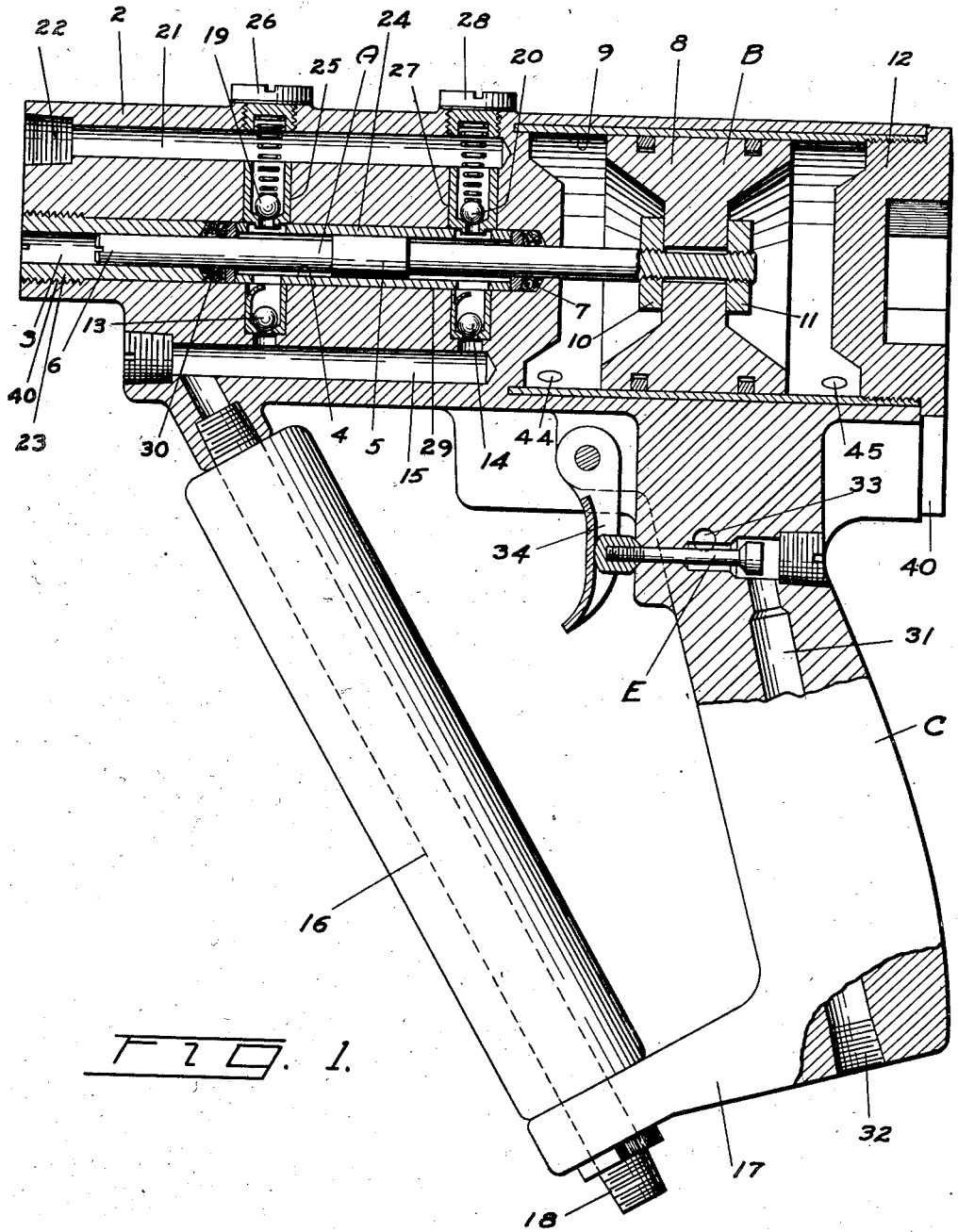

Patented Apr. 7, 1936

2,036,509

UNITED STATES PATENT OFFICE 2,036,509

LUBRICATING DEVICE

Harry R. Tear, South Bend, Ind., assignor to The Lubrication Corporation, South Bend, Ind., a corporation of Delaware Application April 1, 1932, Serial No. 602,615

8 Claims. (Cl. 121—150)

This invention relates to lubrication devices, and more particularly to air operated lubricant guns or pumps by which lubricant may be continuously supplied, under relatively high pressure, to bearings and parts which are to be lubricated.

One of the objects of the invention is to provide an improved air operated lubricant gun.

Another object is to provide, in an air operated lubricant gun of the air motor type, a novel automatic air operated motor piston actuating valve.

Another object is to provide, in an air operated lubricant gun including an air motor, an automatic air operated motor piston actuating valve wherein back pressure created by valve operation is reduced to a minimum.

Another object is to provide a simple, one piece valve automatically operative to control the admission of the motivating fluid to a fluid operated motor. The construction is such that the chances of the valve sticking or failing properly to perform its functions have been reduced to a minimum.

Other objects, the advantages, and uses of the invention, will be, or should become apparent after reading the following description and claims and after consideration of the accompanying drawings forming a part of this specification, in which:

Fig. 1 is a sectional view of an air operated lubricant gun illustrating an embodiment of my invention;

Fig. 2 is an end elevation of the gun illustrated in Fig. 1;

Fig. 3 is a sectional view along the line III—III of Fig. 2; and

Fig. 4 is a perspective view of the essential element of the automatic air motor valve.

In general, the air operated lubricant gun selected to illustrate my invention comprises a double action high pressure lubricant pump A, an air motor B for operating the pump, a pistol hand grip C for manually supporting the gun, an automatic air valve D for the motor B, and a trigger actuated control valve E.

Referring particularly to Fig. 1, the lubricant pump A comprises a body 2 having aligned bores 3 and 4 disposed longitudinally therein. The bore 4 comprises a pressure cylinder within which a pressure piston 5 is slidably mounted. The piston 5 is mounted upon and intermediate the ends of a plunger rod 6. The outer end of the plunger rod is slidably disposed within the bore 3 and the rearward end extends through a packing gland 7 into that region of the gun body occupied by the air motor B. The air motor B comprises a relatively large piston 8 mounted for reciprocation within a cylinder 9 and secured to the plunger rod 6 by nuts 10 and 11 disposed upon a threaded portion of the plunger rod which extends through the piston 8. The rear end of the cylinder 9 is closed by a removable screw plug 12 to permit accessibility to the parts as for service or replacement.

Lubricant is admitted to opposite ends of the bore or cylinder 4 through inlet check valves 13 and 14, of the ball type, both of which communicate with an inlet passage 15 connected at its forward end with an inlet tube 16. The tube 16 extends downwardly and rearwardly of the gun and is secured at its lower end to a projecting portion 17 of the hand grip C. The lower end of the tube is externally threaded, as shown at 18, for connection with a lubricant supply hose (not shown).

Lubricant is discharged from the gun through outlet check valves 19 and 20, of the spring pressed ball type, communicating with the opposite ends of the cylinder 4, both of which are connected with a bore 21 extending longitudinally of the body 2 and externally threaded at its outer end 22 for direct engagement, if desired, with a lubricant discharge nozzle. As an alternative arrangement, however, the discharge bore 21 may be connected to a lubricant hose having a discharge nozzle at the outer end, in which case the hose will be directly connected to the internally threaded portion 22 of the bore.

The disposition of the check valves 13, 14, 19 and 20 with respect to the pressure chamber of the pump A and the lubricant inlet and discharge bores 15 and 21 is such as to greatly facilitate construction and assembly, as well as accessibility to the parts for service or replacement. This advantage is attained by arranging the valves 13 and 19 in a bore 25 which is formed transversely through the body 2 to intersect the bore 21, the cylinder bore 4 and to communicate with the bore 15. A cap screw 26 may be employed to close the upper end of the bore 25 and also to serve as an abutment for the valve spring of the valve 19. A similar arrangement may be carried out with respect to the valves 14 and 20 by the formation of a transverse bore 27 corresponding to the bore 25 and a cap screw 28 corresponding in function to the cap screw 26.

Air for operating the air motor B may be admitted through a bore 31 extending longitudinally through the pistol grip C. The lower end of the bore 31 is preferably internally threaded at 32 so that an air hose may be connected thereto from the source of air supply.

The bore 31 communicates with a transverse and upwardly extending bore 33 through the valve E which is normally held closed by the pressure of air in the bore 31 applied thereto. Means for actuating the valve E comprises a trigger 34 conveniently disposed with respect to the pistol grip C so that it may be operated by the index finger of the hand when the gun is manually supported. The remote end of the bore 33 (see Fig. 3) communicates with the central lower portion of the cylinder 35 of the automatic air valve D the position of which, with respect to the surrounding structure, is best illustrated in Fig. 2. The cylinder 35 is inserted within a bore 36 formed in the body 2 of the gun and the end of the bore is closed by a screw plug 40 which also serves as an end wall of the cylinder 35.

An integral piston valve member 37 is slidably disposed within the cylinder 35 and is held against rotation therein by a stud screw 38 which extends through the cylinder 35 and into a longitudinal groove 39 formed in the lower wall of the member 37.

Air is admitted to the air motor B through the valve E alternately through passages 41 and 42, formed in the valve member 37, both of which communicate with a recess 43 in constant communication with the bore 33. The passages 41 and 42 alternately register with passages 44 and 45, which interconnect the cylinder 9 and the cylinder 35 at opposite end regions thereof, depending upon the position of the valve member 37 in the cylinder 35. With the parts as shown in Fig. 3 air may be admitted through the passages 42 and 45 to the cylinder 9 at the rear of the piston 8. The passage 44 is in registration with a recess 47 in the side wall of the valve member which is at the moment also registered with an exhaust port 48; hence air ahead of the piston 8 is free to pass through to atmosphere as the piston progresses forwardly.

Means for shifting the valve member 37 when the piston 8 has reached the end of its travel in a forward direction comprises a passage 51 interconnecting the cylinder 9 and the cylinder 35 at a point normally covered by the broad side walls of the piston 8 during all but the latter portion of its forward stroke. As the mouth of the passage 51 is uncovered air under pressure is admitted to the passage which is constantly in registration with a bore 52 extending longitudinally through one end of the valve 37. The mouth of the bore 52 is disposed at the rear end of the valve member 37 so that a pressure is created at the rear of the valve 37 causing it to be propelled forwardly to the opposite end of the cylinder 35. As this occurs, the passage 41 moves into registration with the passage 44 and air under pressure is applied at the forward side of the piston 8 to cause it to reverse its direction of travel. The exhaust air at the rear of the piston 8 may now pass through the passage 45 and a recess 53 corresponding with the recess 47 in the valve member 37 which interconnects the passage 45 with the exhaust port 48'.

A bore 55 corresponding with the bore 52 is formed in the opposite end of the valve member 37 and its mouth is located at the forward end thereof. The opposite end of the bore 55 is at all times in registration with a passage 56 corresponding with the passage 51. When the piston 8 reaches the end of its rearward stroke the mouth of the passage 56 will be uncovered and air under pressure conducted through the bore 52 in the valve member 37 to cause the valve member to return to the position shown in the drawings in Fig. 3.

I have thus provided a lubricant gun of the air motor type wherein air is alternately admitted and exhausted to and from opposite sides of a motor piston by operation of the automatic air valve, the sole moving part of which comprises an integral metal piston-like body as illustrated in Fig. 4.

In order that the valve member 37 may not lag during its initial movement relatively large bleed passages 60 and 61 are provided through the wall of the cylinder 35 to atmosphere so that air pressure applied to the valve member, during the shifting thereof from one end of the cylinder to the other, may be quickly reduced to atmospheric pressure preparatory to the return stroke in the opposite direction. Relatively small bleed openings 62 and 63 are also provided through the cylinder 35 at the remote ends of its side wall so that sufficient air may be expelled from ahead of the valve to permit rapid movement and yet retain a slight cushioning effect. The size of the bleed openings 60 to 63 inclusive, relative to the diameter of the cylinder 35 and the air pressure applied, may be varied to determine the range of speed through which the air motor is to operate as the speed of travel of the piston-valve 37 is directly dependent upon the diameter of the bleed openings and the air pressure applied to the valve alternately through the bores 52 and 55.

With reference to Fig. 4 the piston-valve element 37 is illustrated therein in perspective to more clearly show the relationship of the various passages, grooves and bores all formed in a single metal cylindrical body thereby positively maintaining operative relationship and attaining simplicity of structure and method of manufacture.

The adjacent mouths of the bores 52 and 55 are elongated as shown at 64 and 65 respectively so that the bores may be at all times in communication with the passages 51 and 56 as heretofore described. As may be seen the bores may be formed by drill entry through the ends and side walls of the valve member and the elongated mouth formed by milling process. The recesses 43, 47 and 53 may be formed by lateral milling and the groove 39 by a longitudinal milling cut after formation of the recess 43.

The aligned bores 3 and 4 of the lubricant pump assembly may be formed of a pair of tubular members 23 and 24 respectively inserted in a longitudinal bore 29 formed in the body 2 of the gun and packing rings 30 and 7 disposed about the plunger rod 6 between the adjacent ends of the members and between the member 24 and the inner end of the bore 29 respectively. The members 23 and 24 together with their packing rings may be held in place by threaded engagement between the outer wall of the member 23 and the wall of the bore 29, as shown at 40. Openings should be provided through the side walls of the tubular member 24 to register with the bores 25 and 27 respectively.

If desirable, however, the valve member 37 may be entirely formed by die cast methods and the cylindrical surface ground or otherwise surfaced.

It is to be understood that the above described embodiments of the invention are for the purpose of illustration only and various changes may be made therein without departing from the spirit and scope of the invention.

I claim:

1. In an air operated lubricant gun including an air motor having a piston, an automatic air valve comprising a cylinder, a piston-like valve member of uniform diameter throughout its length and having a plurality of non-circumferential grooves or depressions in its outer side wall slidably disposed in said cylinder, means controlled by said valve member when at one end of said cylinder for supplying air under pressure to one side of said motor piston, means controlled by said valve member when at the other end of said cylinder for supplying air under pressure to the opposite side of said piston and means for admitting air alternately to opposite ends of said cylinder to shift said valve member therein, said last named means including passageways extending from the ends of said valve member to the mid-portion thereof and relatively short passageways extending perpendicularly to the axes of the motor piston and valve located between the valve chamber and the motor cylinder.

2. In an air operated lubricant gun including an air motor having a piston, an automatic air valve comprising a cylinder, a piston-like valve member of uniform diameter throughout its length and having a plurality of non-circumferential grooves or depressions in its outer side wall slidably disposed in said cylinder, means controlled by said valve member when at one end of said cylinder for supplying air under pressure to one side of said motor piston, means controlled by said valve member when at the other end of said cylinder for supplying air under pressure to the opposite side of said piston and means including said motor piston for admitting air alternately to opposite ends of said cylinder, said last named means including passageways extending from the ends of said valve member to the mid-portion thereof and relatively short passageways extending perpendicularly to the axes of the motor piston and valve located between the valve chamber and the motor cylinder.

3. In an automatic air valve, a cylinder having ports through the side walls thereof and a valve member mounted for reciprocation in said cylinder, said member comprising an integral piston-like body engaging circumferentially with the inner side walls of the cylinder and formed with non-circumferential grooves in the side walls extending laterally thereacross for by-passing air from one point on the circumference of the member to another, bores extending inwardly from each end wall of said member and terminating in ports on the side walls thereof and other bores formed transversely through the member and communicating with each other at one end.

4. In an automatic air valve, a cylinder and a valve member mounted for reciprocation in said cylinder, said member comprising a piston-like body formed with grooves in the side walls extending laterally thereacross throughout a portion only of the circumference of said body for by-passing air from one point on the circumference of the member to another, and a bore extending inwardly from each end wall of the member and terminating in elongated ports on the side wall thereof extending longitudinally at the valve body, said member being further formed with projections on each end wall.

5. In a fluid operated automatic valve, a cylinder having ports through the side walls thereof and a piston-valve mounted for reciprocation in said cylinder, said piston-valve comprising an integral metal member formed with grooves in the side walls extending laterally thereacross for by-passing fluid from one point on the circumference of the valve to another, bores extending inwardly from each end wall of said valve and terminating in ports on the side walls thereof and other bores formed transversely through the member and communicating with each other at one end, said grooves and said bores being adapted to selectively register with certain of said ports in said cylinder when the piston-valve is reciprocated therein, said cylinder being further formed with a plurality of atmospheric bleed openings of different diameters therethrough adjacent to each of the ends thereof for exhausting air from the cylinder in varying amounts as displaced by valve movement.

6. A fluid operated automatic valve for controlling the piston movement of a fluid operated motor, comprising a piston-valve adapted for reciprocation within a cylinder, means for actuating the valve by admitting fluid alternately to the ends of said cylinder, said means including ports in the cylinder of the motor adapted to be uncovered by the motor piston when in certain positions, said ports being in communication with the cylinder of said valve and a plurality of bleeder ports in the valve cylinder adjacent to each end thereof arranged progressively to be covered by the valve as it moves toward the respective ends of the cylinder to control the exhaustion of the valve operating fluid therefrom.

7. A fluid operated automatic valve for controlling the piston movement of a fluid operated motor, comprising a piston-valve adapted for reciprocation within a cylinder, means for actuating the valve by admitting fluid alternately to the ends of said cylinder, said means including ports in the cylinder of the motor adapted to be uncovered by the motor piston when in certain positions, said ports being in communication with the cylinder of said valve and bleeder ports in the valve cylinder to control the exhaustion of the valve operating fluid therefrom certain of said bleeder ports being of relatively large diameter and disposed adjacent to the end of the piston-valve whereby the port may be immediately covered by the valve when moved by fluid applied to the remote end of the cylinder.

8. A fluid operated automatic valve for controlling the piston movement of a fluid operated motor comprising, a valve cylinder, a piston valve mounted for reciprocation within said cylinder, means for admitting fluid alternately to the ends of said cylinder for causing said valve to reciprocate between the ends of the cylinder, said means including ports in the cylinder of the fluid motor adapted to be uncovered by the fluid motor piston when in certain positions, said ports being in communication with said valve cylinder, and a plurality of bleeder ports adjacent to each end of the valve cylinder, the bleeder ports at each said end being of increasing diameter in a direction away from the said end whereby fluid admitted to the valve cylinder at the end of the valve to cause valve movement may be exhausted from the valve cylinder in increasing amounts as the valve is urged along the cylinder under the force of the fluid.

HARRY R. TEAR.

CERTIFICATE OF CORRECTION.

Patent No. 2,036,509.                                               April 7, 1936.

HARRY R. TEAR.

It is hereby certified that error appears in the printed specification of the above numbered patent requiring correction as follows: Page 3, first column, line 68, claim 4, for the word "at" read of; and that the said Letters Patent should be read with this correction therein that the same may conform to the record of the case in the Patent Office.

Signed and sealed this 26th day of May, A. D. 1936.

Leslie Frazer (Seal)                                      Acting Commissioner of Patents.